United States Patent
Ishikawa et al.

(10) Patent No.: US 12,492,652 B2
(45) Date of Patent: Dec. 9, 2025

(54) BLOW-BY GAS RECIRCULATION DEVICE

(71) Applicant: TOYOTA JIDOSHA KABUSHIKI KAISHA, Toyota (JP)

(72) Inventors: Masami Ishikawa, Aichi-ken (JP); Tomoya Oshima, Susono (JP); Yukio Koseki, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/885,936

(22) Filed: Sep. 16, 2024

(65) Prior Publication Data

US 2025/0116215 A1   Apr. 10, 2025

(30) Foreign Application Priority Data

Oct. 4, 2023   (JP) .................. 2023-172484

(51) Int. Cl.
  *F01M 13/02*   (2006.01)
  *F01M 13/00*   (2006.01)
  *F02D 9/10*   (2006.01)
  *F02D 41/00*   (2006.01)

(52) U.S. Cl.
  CPC .......... *F01M 13/028* (2013.01); *F01M 13/00* (2013.01); *F01M 13/0011* (2013.01); *F01M 13/022* (2013.01); *F02D 9/10* (2013.01); *F02D 41/0007* (2013.01); *F01M 2013/0038* (2013.01); *F01M 2013/0044* (2013.01); *F01M 2013/0066* (2013.01); *F01M 2013/0072* (2013.01); *F01M 2013/027* (2013.01); *F02D 2250/08* (2013.01)

(58) Field of Classification Search
CPC .. F01M 13/00; F01M 13/0011; F01M 13/022; F01M 13/028; F01M 2013/0038; F01M 2013/0044; F01M 2013/0066; F01M 2013/0072; F01M 2013/027; F02D 9/10; F02D 41/0007; F02D 2250/08
See application file for complete search history.

(56) References Cited

U.S. PATENT DOCUMENTS

2008/0083399 A1*   4/2008   Hirano .................. F01M 13/02
                                                                                     123/572
2013/0291843 A1*   11/2013   Kitayama .............. F01M 13/04
                                                                                     123/574

(Continued)

FOREIGN PATENT DOCUMENTS

| JP | S57-013814 U | 1/1982 |
| JP | 2006-046244 A | 2/2006 |
| JP | 2008-111422 A | 5/2008 |

(Continued)

*Primary Examiner* — Audrey B. Walter
(74) *Attorney, Agent, or Firm* — SoraIP, Inc.

(57) ABSTRACT

A first passage communicating a portion downstream side of the compressor in the intake passage and an upstream side of the intercooler with the crankcase, a second passage communicating a portion downstream of the intercooler in the intake passage with the crankcase, and a third passage communicating a portion upstream of the compressor in the intake passage with the crankcase are installed in the turbocharged engine, and a switching valve for switching between a state in which the first passage communicates and the second passage is blocked, and a state in which the first passage is blocked and the second passage communicates is provided.

5 Claims, 3 Drawing Sheets

(56) References Cited

U.S. PATENT DOCUMENTS

2016/0341154 A1\* 11/2016 Okawa ................ F02D 13/0234
2020/0102863 A1\* 4/2020 Ishikawa ............ F01M 13/0011

FOREIGN PATENT DOCUMENTS

| JP | 2010025022 A | \* | 2/2010 |
| JP | 2011236827 A | \* | 11/2011 |
| JP | 2013185545 A | \* | 9/2013 |
| JP | 2013256939 A | \* | 12/2013 |
| WO | 2008/041113 A2 | | 4/2008 |

\* cited by examiner

BLOW-BY GAS RECIRCULATION DEVICE

CROSS-REFERENCE TO RELATED APPLICATION

This application claims priority to Japanese Patent Application No. 2023-172484 filed on Oct. 4, 2023, incorporated herein by reference in its entirety.

BACKGROUND

1. Technical Field

The disclosure relates to a blow-by gas recirculation device that recirculates blow-by gas in a crankcase of a turbocharged engine to an intake passage.

2. Description of Related Art

A device described in Japanese Unexamined Patent Application Publication No. 2006-46244 (JP 2006-46244 A) is known as a blow-by gas recirculation device such as described above. The blow-by gas recirculation device performs ventilation of blow-by gas by introducing intake air that is pressurized by a compressor into the crankcase.

SUMMARY

When temperature in the crankcase is low, moisture in the blow-by gas condenses. Lubrication performance of the engine oil may deteriorate due to the condensed water becoming intermingled therein.

A blow-by gas recirculation device for solving the above problem is a blow-by gas recirculation device for recirculating blow-by gas, to an intake passage, in a crankcase of a turbocharged engine that includes a compressor installed in the intake passage and an intercooler installed at a portion of the intake passage on a downstream side of the compressor, the blow-by gas recirculation device including
 a first passage that causes a portion of the intake passage, on the downstream side of the compressor and on an upstream side of the intercooler, to communicate with the crankcase, a second passage that causes a portion of the intake passage, on a downstream side of the intercooler, to communicate with the crankcase,
 a third passage that causes a portion of the intake passage, on an upstream side of the compressor, to communicate with the crankcase, and a switching mechanism.
The switching mechanism is a mechanism that switches between a state in which the first passage communicates and the second passage is blocked, and a state in which the first passage is blocked and the second passage communicates.

This blow-by gas recirculation device is advantageous in that warm-up of inside of the crankcase can be suitably performed in conjunction with ventilation of the crankcase.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
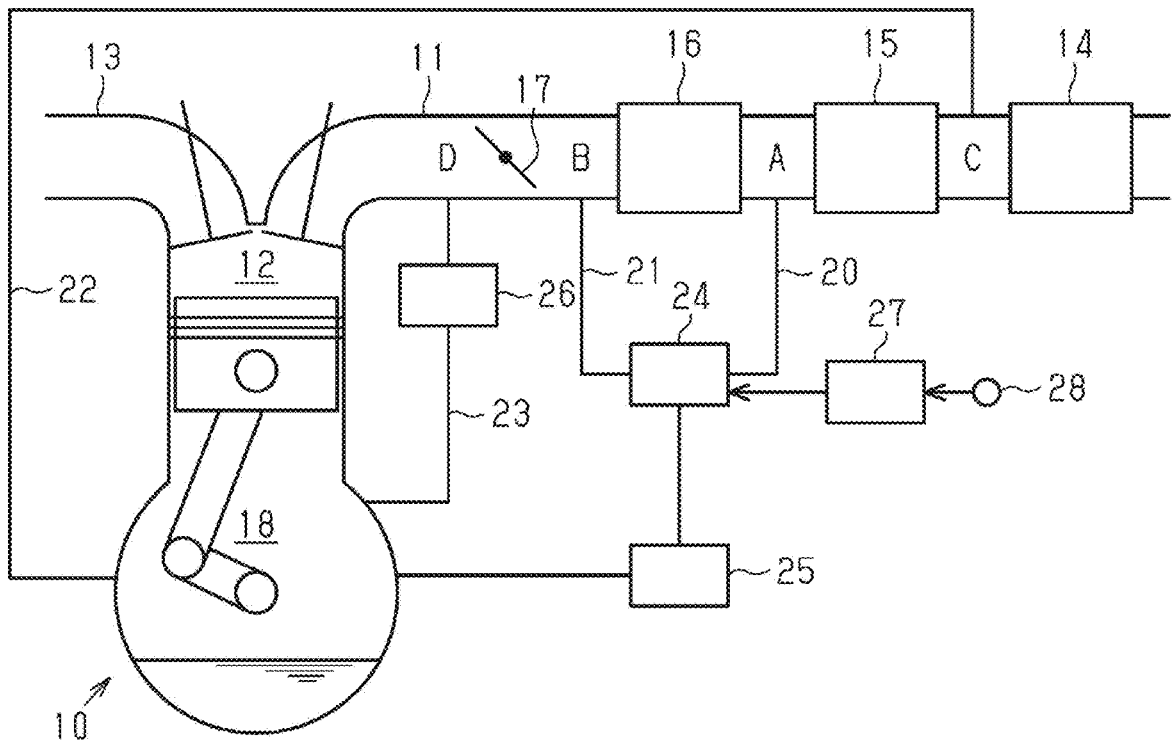
FIG. 1 is a diagram schematically illustrating a configuration of an embodiment of a blow-by gas recirculation device.

Hereinafter, an embodiment of a blow-by gas recirculation device will be described in detail with reference to FIGS. 1 to 5.
Configuration of Blow-by Gas Recirculation Device
First, the configuration of the blow-by gas recirculation device of the present embodiment will be described with reference to FIG. 1. The blow-by gas recirculation device of the present embodiment is installed in an on-vehicle turbocharged engine 10.

The turbocharged engine 10 is a hydrogen engine that generates power by burning hydrogen. The turbocharged engine 10 includes an intake passage 11, a combustion chamber 12, and an exhaust passage 13. Intake air is introduced into the combustion chamber 12 through the intake passage 11. In the combustion chamber 12, combustion of an air-fuel mixture of intake air and hydrogen is performed. The exhaust gas generated by the combustion in the combustion chamber 12 is discharged through the exhaust passage 13.

An air cleaner 14 for filtering the intake air taken from the outside is installed in the intake passage 11. A compressor 15, which is a supercharger, is installed in a portion of the intake passage 11 downstream side of the air cleaner 14. The compressor 15 operates according to the flow rate of the exhaust gas flowing through the exhaust passage 13. An intercooler 16 is installed in a portion of the intake passage 11 downstream side of the compressor 15. The intercooler 16 cools the intake air that has reached a high temperature by adiabatic compression in the compressor 15. A throttle valve 17 is installed in a portion of the intake passage 11 downstream side of the intercooler 16. The throttle valve 17 is a valve that adjusts the amount of intake air introduced into the combustion chamber 12 by changing the flow passage area of the intake air in the intake passage 11.

The blow-by gas recirculation device of the present embodiment recirculates the blow-by gas in the crankcase 18 of the turbocharged engine 10 into the intake air, thereby ventilating the crankcase 18. Incidentally, the engine oil is retained at the bottom of the crankcase 18.

The blow-by gas recirculation device of the present embodiment includes four passages, namely, a first passage 20, a second passage 21, a third passage 22, and a fourth passage 23, as passages for communicating the intake passage 11 with the crankcase 18. The first passage 20 is a passage that communicates a portion of the intake passage 11 downstream side of the compressor 15 and upstream side of the intercooler 16 with the crankcase 18. The second passage 21 is a passage that communicates a portion of the intake passage 11 downstream side of the intercooler 16 and upstream side of the throttle valve 17 with the crankcase 18. The third passage 22 is a passage that communicates a portion of the intake passage 11 upstream side of the compressor 15 and downstream side of the air cleaner 14 with the crankcase 18. The fourth passage 23 is a passage that communicates a portion of the intake passage 11 downstream side of the throttle valve 17 with the crankcase 18. Although not shown, the third passage 22 and the fourth passage 23 are respectively provided with oil separators for removing oil in the blow-by gas passing therethrough.

Further, the blow-by gas recirculation device includes a switching valve 24, a one-way valve 25, a PCV (Positive Crankcase Ventilation) valve 26, and a control unit 27. The switching valve 24 is a solenoid valve that switches between a state in which the first passage 20 communicates with the second passage 21 and a state in which the first passage 20 closes and the second passage 21 communicates with each other. The one-way valve 25 is a valve that restricts the flow of gas from the crankcase 18 to the intake passage 11 through the first passage 20 and the second passage 21. PCV valve 26 is a valve that restricts the flow of gases from the intake passage 11 to the crankcase 18 through the fourth passage 23. The control unit 27 is an electronic control unit that controls the operation of the switching valve 24. An exemplary control unit 27 is an electronic control module (ECM: Engine Control Module) for engine control. The control unit 27 receives a detection signal from the oil temperature sensor 28 that detects the oil temperature THO that is the temperature of the engine oil.

In the case of FIG. 1, the first passage 20 and the second passage 21 are passages that are independent of each other in the portion on the intake passage 11 side, but the portion on the crankcase 18 side is grouped into one passage. The switching valve 24 is installed at the junction of the first passage 20 and the second passage 21. The one-way valve 25 is disposed at a portion of the first passage 20 and the second passage 21 closer to the crankcase 18 than the switching valve 24.

In the following description, the pressure of the intake air in the portion of the intake passage 11 on the downstream side of the throttle valve 17 is referred to as the intake pipe pressure. Further, the operation of the turbocharged engine 10 in a state where the intake pipe pressure becomes a negative pressure less than the atmospheric pressure is referred to as a natural intake operation. Further, the operation of the turbocharged engine 10 in a state in which the intake pipe pressure becomes a positive pressure higher than the atmospheric pressure is referred to as a supercharging operation.

The switching valve 24 in the blow-by gas recirculation device configured as described above has a function of exclusively communicating the next two portions A and B in the intake passage 11 with the crankcase 18. The portion A is a portion of the intake passage 11 downstream side of the compressor 15 and upstream side of the intercooler 16. The portion B is a portion on the downstream side of the intercooler 16 or on the upstream side of the intercooler 16 in the intake passage 11. The portion A of the turbocharged engine 10 during the supercharging operation is supplied with intake air having a high temperature and a positive pressure due to the supercharging operation of the compressor 15. On the other hand, the portion B of the turbocharged engine 10 during the supercharging operation has a positive pressure as in the case of the portion A, but the intake air having a temperature lower than that of the intake air flowing through the portion A flows due to the cooling by the intercooler 16. In the present embodiment, the switching valve 24 corresponds to the switching mechanism.

Incidentally, the pressure of the intake air in the portion C on the upstream side of the compressor 15 in the intake passage 11 to which the third passage 22 is connected is the atmospheric pressure both during the supercharging operation of the turbocharged engine 10 and during the natural intake operation. In addition, the portion D of the intake passage 11 downstream side of the throttle valve 17 to which the fourth passage 23 is connected becomes a negative pressure due to the throttle by the throttle valve 17 during the natural intake operation of the turbocharged engine 10.

Control of the Switching Valve

Figure 2:
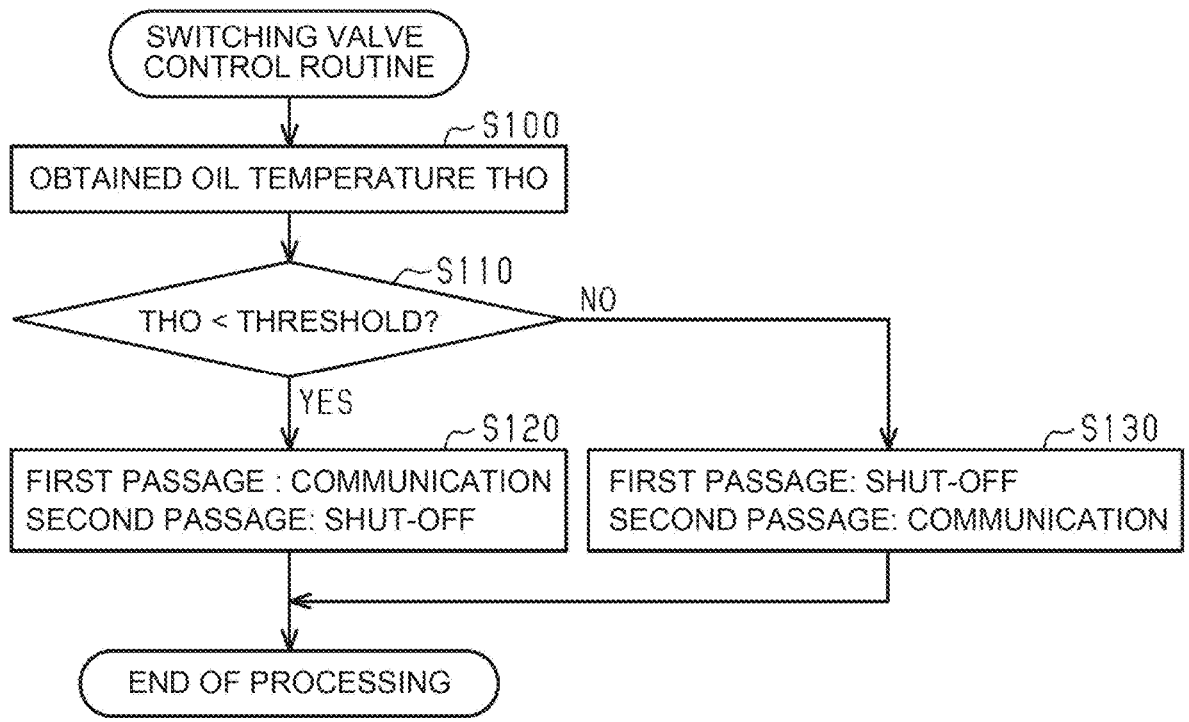
FIG. 2 is a flowchart of a switching control routine executed by a control unit included in the blow-by gas recirculation device.

Next, the control of the switching valve 24 executed by the control unit 27 will be described with reference to FIG. 2. FIG. 2 is a flowchart of a switching valve control routine executed by the control unit 27 for controlling the switching valve 24. During the operation of the turbocharged engine 10, the control unit 27 repeatedly executes the same routine every predetermined control cycle. In FIGS. 2 and S100 below, "S" in S130 represents steps.

When this routine is started, the control unit 27 first acquires the oil temperature THO in S100 based on the detected signal from the oil temperature sensor 28. Next, in S110, the control unit 27 determines whether or not the oil temperature THO is less than the predetermined thresholds. When the oil temperature THO is less than the threshold (YES), the control unit 27 controls the switching valve 24 so that the first passage 20 is in communication and the second passage 21 is in the shut-off state (S120). On the other hand, when the oil temperature THO is equal to or higher than the threshold value (NO), the control unit 27 controls the switching valve 24 so that the first passage 20 is in a shut-off state and the second passage 21 is in a communicated state (S130). After S120 or S130 processing, the control unit 27 ends the processing of this routine in the current control cycle.

The thresholds used for the determination in S110 of FIG. 2 are set in the following manner. The blow-by gas in the crankcase 18 includes moisture generated by combustion in the combustion chamber 12. When the inside of the crankcase 18 is at a low temperature, moisture in the blow-by gas may be condensed and mixed into the engine oil. Then, the engine oil may become cloudy due to the mixed moisture, and the lubricating capacity of the oil may be lowered. When the temperature of the engine oil in the crankcase 18 becomes higher than a certain level, the temperature in the crankcase 18 also becomes higher, and it becomes difficult to generate condensed water. The above-described threshold is set to a temperature that is the lower limit of the oil temperature THO at which the quantity of the condensed water generated in the crankcase 18 is suppressed to such an extent that the engine oil is not clouded. That is, when the oil temperature THO is less than the threshold value, condensed water is likely to be generated in the crankcase 18.

Operation and Effect of Embodiments

The operation and effects of the blow-by gas recirculation device of the present embodiment configured as described above will be described.

The inside of the crankcase 18 immediately after the cold start is in a state where condensed water is likely to be generated because the temperature is low. At this time, since the engine oil is also not warmed, the oil temperature THO is less than the threshold. Therefore, the control unit 27 at this time controls the switching valve 24 so as to bring the first passage 20 into communication and shut off the second passage 21.

Figure 3:
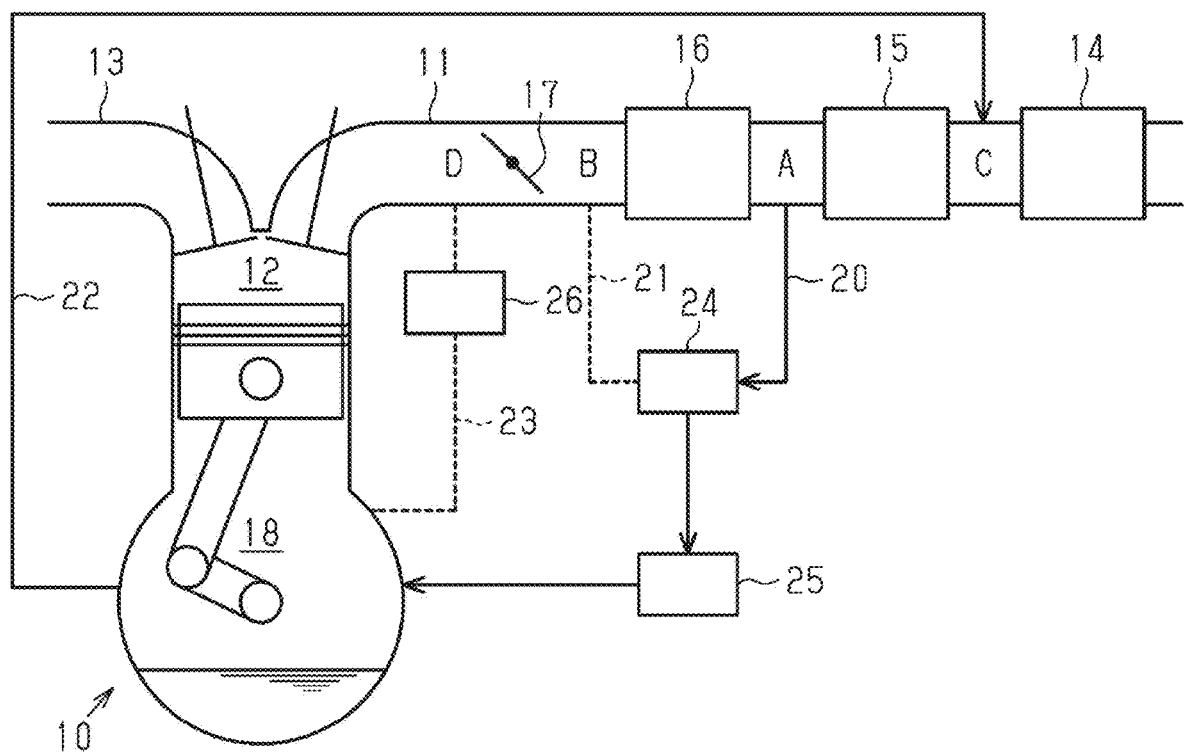
FIG. 3 is a view showing the flow of gas in the blow-by gas recirculation device during the cold supercharging operation.

FIG. 3 shows the gas flow of the blow-by gas recirculation device when the turbocharged engine 10 performs the supercharging operation in a state where the switching valve 24 is controlled as described above. During the supercharging operation, the pressure of the intake air is higher than the atmospheric pressure in the portion A, B, D of the intake passage 11 downstream side of the compressor 15. On the other hand, the pressure of the intake air in the portion C on the upstream side of the compressor 15 in the intake passage 11 to which the third passage 22 is connected is atmospheric pressure. Therefore, as shown in FIG. 3, the intake air flows into the crankcase 18 through the first passage 20 that is communicated with the switching valve 24 among the first passage 20 and the second passage 21. Then, the blow-by gas in the crankcase 18 is recirculated to the portion C on the upstream side of the compressor 15 in the intake passage 11 through the third passage 22 in such a manner that the blow-by gas is pushed out to the intake air that has flowed in. The intake air flowing into the crankcase 18 through the first passage 20 at this time is at a high temperature due to adiabatic compression by the compressor 15. Since the inside of the crankcase 18 is warmed by the high-temperature intake air, generation of condensed water is suppressed.

After that, when the turbocharged engine 10 is warmed up, the oil temperature THO increases. When the oil temperature THO becomes equal to or higher than the threshold value, the control unit 27 switches the switching valve 24 so as to shut off the first passage 20 and communicate the second passage 21.

Figure 4:
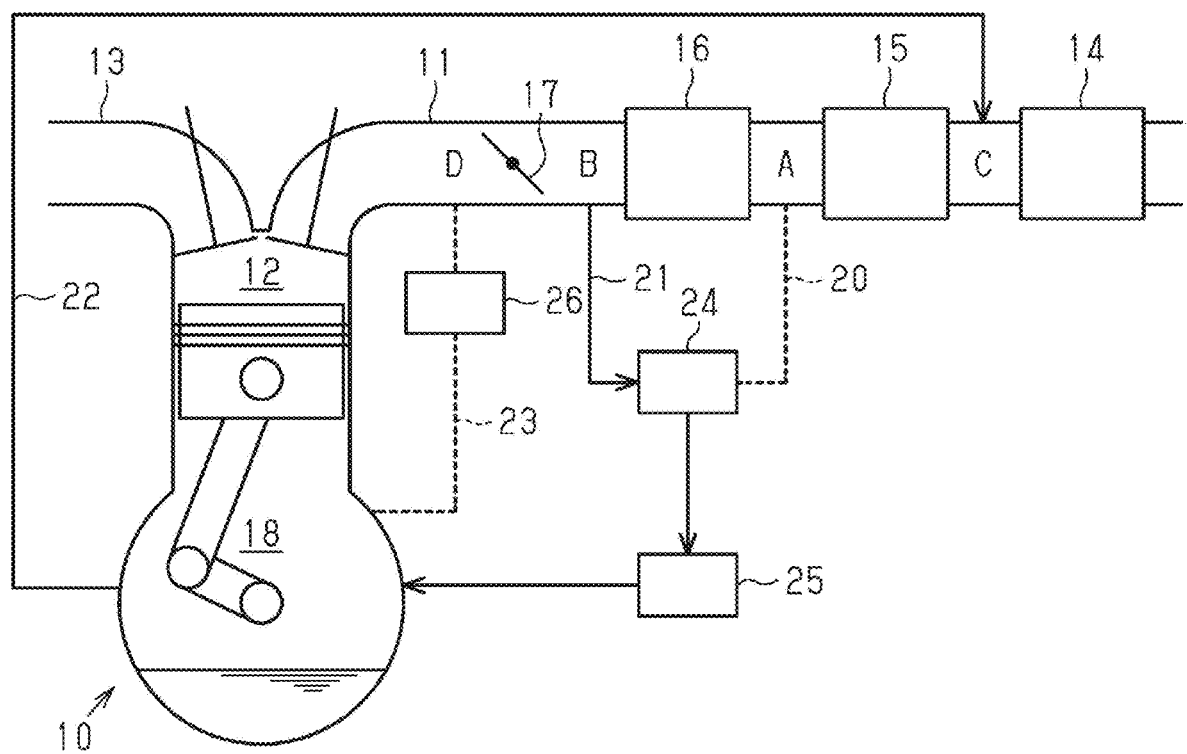
FIG. 4 is a view showing a flow of gas of the blow-by gas recirculation device during the warm supercharging operation.

FIG. 4 shows the flow of the gas in the blow-by gas recirculation device when the turbocharged engine 10 performs the supercharging operation in a state where the switching valve 24 is controlled as described above. At this time, the intake air flows into the crankcase 18 through the second passage 21 that is communicated with the switching valve 24 among the first passage 20 and the second passage 21. Then, the blow-by gas in the crankcase 18 is recirculated to the portion C on the upstream side of the compressor 15 in the intake passage 11 through the third passage 22 in such a manner that the blow-by gas is pushed out to the intake air that has flowed in.

The intake air flowing into the crankcase 18 through the second passage 21 is cooled by the intercooler 16. On the other hand, the density of the intake air increases as the temperature decreases. Therefore, it is possible to introduce more intake air into the crankcase 18 by introducing the intake air before being cooled by the intercooler 16 than by introducing the intake air before being cooled by the intercooler 16. As described above, the control of the switching valve 24 increases the ventilation efficiency of the crankcase 18. Incidentally, the inside of the crankcase 18 at this time is warmed to a state where it is difficult to generate condensed water even if high-temperature intake air does not flow in.

During the natural intake operation of the turbocharged engine 10, the pressure of the intake air in the portion D on the downstream side of the throttle valve 17 in the intake passage 11, that is, the intake pipe pressure becomes a negative pressure lower than the atmospheric pressure. On the other hand, the crankcase 18 communicates with a portion C of the intake passage 11 on the upstream side of the compressor 15 through the third passage 22. Since the portion C on the upstream side of the compressor 15 in the intake passage 11 is at atmospheric pressure, the inside of the crankcase 18 is also at atmospheric pressure. Therefore, the intake air is introduced into the crankcase 18 during the natural intake operation through the third passage 22. Further, the blow-by gas in the crankcase 18 is sucked into the intake passage 11 through the fourth passage 23 by the intake negative pressure formed by the throttle of the throttle valve 17. As described above, the crankcase 18 is ventilated during the natural intake operation.

According to the blow-by gas recirculation device of the present embodiment described above, the following effects can be obtained.

(1) The blow-by gas recirculation device of the present embodiment includes a first passage 20, a second passage 21, a third passage 22, and a switching valve 24. The first passage 20 is a passage that communicates a portion A of the intake passage 11 downstream side of the compressor 15 and upstream side of the intercooler 16 with the crankcase 18. The second passage 21 is a passage that communicates the portion B on the downstream side of the intercooler 16 in the intake passage 11 with the crankcase 18. The third passage 22 is a passage that communicates the portion C on the upstream side of the compressor 15 in the intake passage 11 with the crankcase 18. The switching valve 24 switches between a state in which the first passage 20 communicates with the second passage 21 and a state in which the first passage 20 blocks and the second passage 21 communicates with each other. In such a blow-by gas recirculation device, the intake air introduced into the crankcase 18 during the supercharging operation is switched between the high-temperature intake air before being cooled by the intercooler 16 and the low-temperature intake air after being cooled by the intercooler 16. Therefore, whether to promote warm air in the crankcase 18 by introducing high-temperature intake air or to increase the ventilation efficiency of the crankcase 18 by introducing low-temperature intake air can be selected according to the situation. Therefore, the blow-by gas recirculation device of the present embodiment has an effect that warm-up in the crankcase 18 can be suitably performed together with ventilation of the crankcase 18.

(2) The control unit 27 determines whether or not condensate is likely to be generated in the crankcase 18 based on the oil temperature THO. The control unit 27 controls the switching valve 24 so that the first passage 20 is in communication and the second passage 21 is shut off when it is determined that the condensed water is easily generated. In addition, the control unit 27 controls the switching valve 24 so that the first passage 20 is shut off and the second passage 21 is in communication when it is determined that the condensed water is not easily generated. Therefore, warm-up of the crankcase 18 can be effectively performed.

(3) The blow-by gas recirculation device of the present embodiment includes the fourth passage 23 and PCV valve 26 described below in addition to the first passage 20, the second passage 21, the third passage 22, and the switching valve 24. The fourth passage 23 is a passage that communicates the portion D on the downstream side of the throttle valve 17 in the intake passage 11 with the crankcase 18. PCV valve 26 is a valve that restricts the flow of gases from the intake passage 11 to the crankcase 18 through the fourth passage 23. Therefore, the crankcase 18 can be ventilated even during the natural intake operation.

(4) The blow-by gas recirculation device of the present embodiment includes a one-way valve 25 that restricts the flow of gas from the crankcase 18 to the intake passage 11 through the first passage 20 and the second passage 21. Therefore, it is possible to prevent the blow-by gas in the crankcase 18 from flowing into the intake passage 11 through the first passage 20 and the second passage 21 during the natural intake operation of the turbocharged engine 10 or during the stop of the operation.

(5) The blow-by gas recirculation device of the present embodiment is applied to a hydrogen engine. Since hydrogen becomes water when burned, the amount of water in blow-by gas tends to be larger than that in gasoline engines and diesel engines. Therefore, the blow-by gas recirculation device of the present embodiment, in which the warm air in the crankcase 18 can be suitably implemented, is particularly preferably applied to a hydrogen engine.

Other Embodiments

Warm Air in the Crankcase During Natural Intake Operation

There is a turbocharger capable of adjusting a supercharging rate of intake air like a turbocharger of a variable nozzle type. When the blow-by gas recirculation device of the above-described embodiment is applied to the turbocharged engine including the supercharger capable of adjusting the supercharging rate, the crankcase 18 can be warmed up even during the natural intake operation. In the following explanation, the pressure of the intake air on the portion A, B of the intake passage 11 on the downstream side of the compressor 15 and on the upstream side of the throttle valve 17 is referred to as a supercharging pressure.

Figure 5:
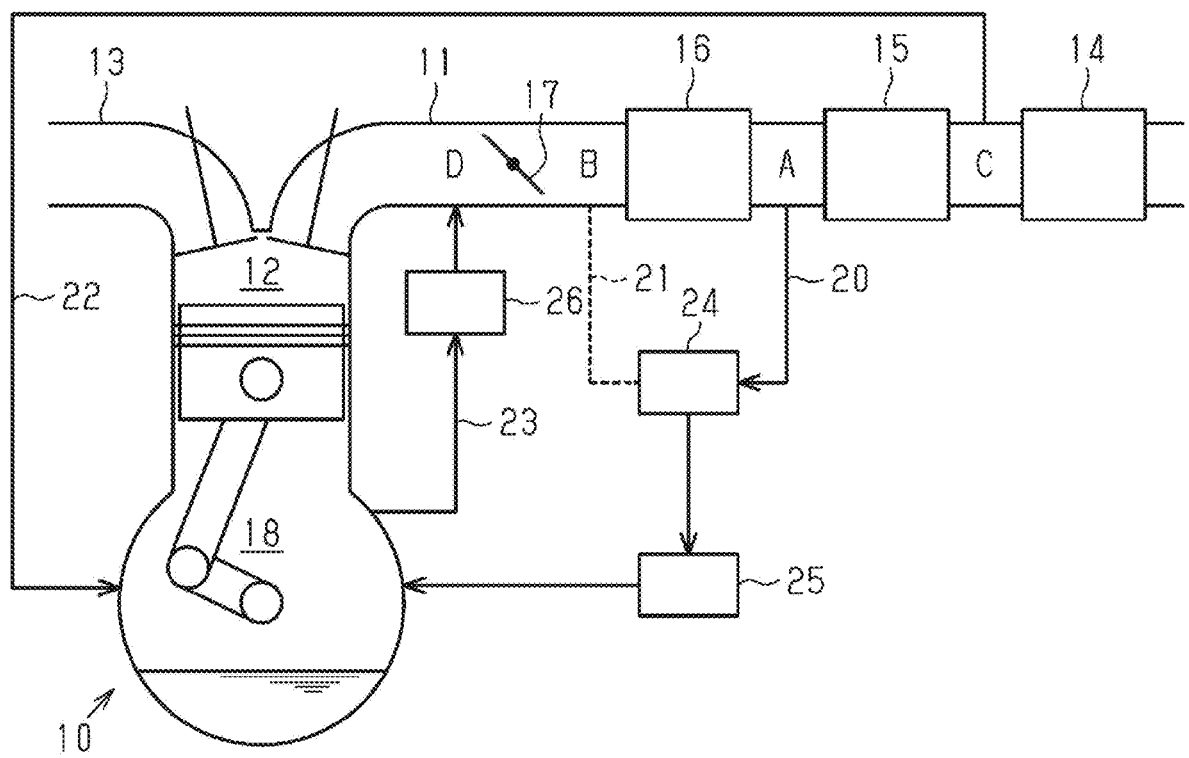
FIG. 5 is a view showing a gas flow of the blow-by gas recirculation device when warm-up is performed during a natural intake operation.

FIG. 5 shows the flow of the gas in the blow-by gas recirculation device when the crankcase 18 is warmed during the natural intake operation. The amount of intake air flowing into the combustion chamber 12 of the turbocharged engine 10 is determined by the engine speed and the intake pipe pressure. In the case of the turbocharged engine 10 including the supercharger capable of adjusting the supercharging rate, the supercharging pressure can be increased while maintaining the intake pipe pressure by increasing the supercharging rate and reducing the opening degree of the throttle valve 17 during the natural intake operation. Thus, the supercharging pressure can be set to a positive pressure higher than the atmospheric pressure even during the natural intake operation. In this state, when the switching valve 24 is controlled in a state where the first passage 20 is communicated and the second passage 21 is shut off, hot intake air is introduced into the crankcase 18 through the first passage 20. Then, the blow-by gas of the crankcase 18 is recirculated to the intake passage 11 through the fourth passage 23. Therefore, the crankcase 18 can be ventilated while the air is warmed even during the natural intake operation.

Determining Whether or not Condensed Water is Likely to be Generated

In the above-described embodiment, it is determined whether or not condensed water is likely to be generated in the crankcase 18 depending on whether or not the oil temperature THO is less than the threshold value. This determination may be made by other methods. For example, the following determination method can be considered.

The determination may be made based on the coolant temperature of the turbocharged engine 10 instead of the oil temperature THO.

The above determination may be performed based on the elapsed time after the start of the turbocharged engine 10. The temperature in the crankcase 18 after the cold start is about the same as the outside air temperature at the time of the start, and thereafter increases with the lapse of time. Therefore, it can be estimated that the inside of the crankcase 18 is in a state in which condensed water is likely to be generated at a low temperature until a predetermined time elapses after the start of the turbocharged engine 10. In addition, the same determination can be made based on the integrated intake air amount and the integrated rotational speed after the start of the turbocharged engine 10. Note that the temperature in the crankcase 18 at the start time varies depending on the outside air temperature. Therefore, it is desirable to perform the determination based on the elapsed time after starting as described above in a manner reflecting the influence of the outside air temperature. For example, the elapsed time after the start is determined to be switched from a state in which condensed water is likely to be generated to a state in which it is difficult to generate, it may be a longer time than when the outside air temperature is low.

As a device to be applied to the turbocharged engine 10, there is a EGR device that recirculates a part of the exhaust gas into the intake air. Exhaust (EGR gases) that is recirculated by EGR device into the intake air contains water. When EGR gas is introduced into the low-temperature intake air cooled by the intercooler 16, water in EGR gas may condense. At this time, when the intake air is introduced into the crankcase 18 through the second passage 21, there is a possibility that the condensed water generated in the intake passage 11 flows into the crankcase 18. Therefore, it may be determined that the condensed water is easily generated during the introduction of EGR gases. Then, by ventilating the crankcase 18 in a state where the first passage 20 is communicated and the second passage 21 is shut off in response to the determination, the inflow of the condensed water generated in the intake passage 11 to the crankcase 18 is suppressed.

About Configuration of Blow-by Gas Recirculation Device

The one-way valve 25 may be provided individually at a portion of the first passage 20 and the second passage 21 closer to the intake passage 11 than the switching valve 24.

When the switching valve 24 is configured so that both the first passage 20 and the second passage 21 can be shut off, backflow of the blow-by gas to the intake passage 11 can be prevented by control of the switching valve 24. In this case, the one-way valve 25 can be omitted. In addition, in some cases, a reverse flow of the blow-by gas to the intake passage 11 through the first passage 20 and the second passage 21 can be allowed, such as when an oil separator for removing oil in the blow-by gas is installed in the first passage 20 and the second passage 21. Even in such a case, the one-way valve 25 can be omitted.

Figure 6:
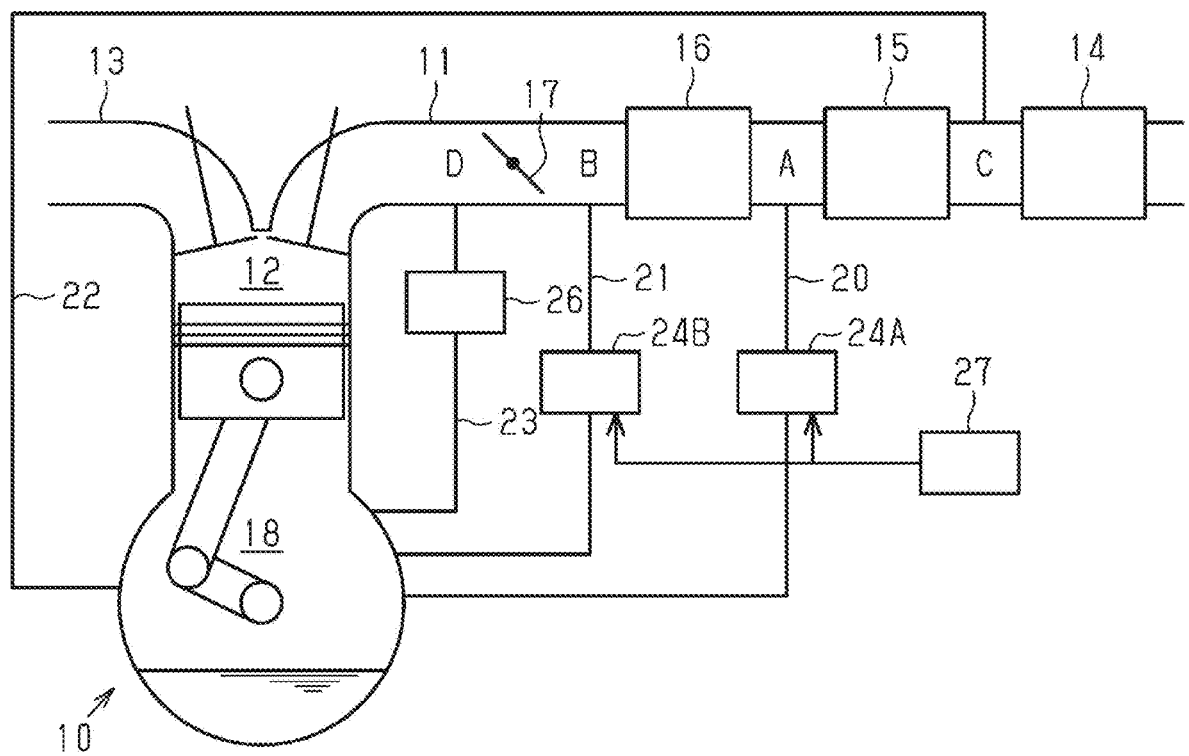
FIG. 6 is a diagram schematically illustrating a configuration of a modified example of the blow-by gas recirculation device.

As shown in FIG. 6, the first passage 20 and the second passage 21 may be independent passages. In FIG. 6, a switching valve 24A, 24B is installed in each of the first passage 20 and the second passage 21. The control unit 27 controls the two switching valve 24A, 24B so that only one of the first passage 20 and the second passage 21 is in communication. The switching mechanism is constituted by two switching valve 24A, 24B. Note that, in FIG. 6, the control unit 27 controls the switching valve 24A, 24B to be shut off both during the natural intake operation or during the shutdown of the turbocharged engine 10. Thus, the reverse flow of the blow-by gas from the crankcase 18 to the intake passage 11 through the first passage 20 and the second passage 21 is suppressed. Instead of performing such control, a one-way valve that restricts the flow of gas from the crankcase 18 to the intake passage 11 may be installed in each of the first passage 20 and the second passage 21.

When the crankcase 18 does not need to be ventilated during the natural intake operation, the fourth passage 23 and PCV bulb 26 may be omitted.

The blow-by gas recirculation device of the above embodiment and the modification can be applied to a turbocharged engine other than a hydrogen engine such as a gasoline engine or a diesel engine.

What is claimed is:

1. A blow-by gas recirculation device configured to recirculate blow-by gas to an intake passage of a turbocharged engine that includes a compressor installed in the intake passage and an intercooler installed at a portion of the intake passage on a downstream side of the compressor, the blow-by gas recirculation device being provided in a crankcase, and comprising:
    a first passage through which a first portion of the intake passage, on the downstream side of the compressor and on an upstream side of the intercooler, is communicated with the crankcase;
    a second passage through which a second portion of the intake passage, on a downstream side of the intercooler, is communicated with the crankcase;
    a third passage through which a third portion of the intake passage, on an upstream side of the compressor, is communicated with the crankcase; and
    a switching mechanism that is configured to switch between a first state and a second state, the first state being a state in which the first passage communicates the first portion of the intake passage with the crankcase, and the communication between the second portion of the intake passage and the crankcase via the second passage is blocked, and the second state being a state in which the communication between the first portion of the intake passage and the crankcase via the first passage is blocked, and the second passage communicates the second portion of the intake passage with the crankcase.

2. The blow-by gas recirculation device according to claim 1, further comprising a control unit configured to determine whether condensed water is likely to be generated in the crankcase, wherein the control unit is further configured to
    in response to determining that the condensed water is likely to be generated, control the switching mechanism to the first state, and
    in response to determining that the condensed water is not likely to be generated, control the switching mechanism to the second state.

3. The blow-by gas recirculation device according to claim 1, further comprising a fourth passage and a positive crankcase ventilation (PCV) valve, wherein:
    the turbocharged engine includes a throttle valve disposed at a fourth portion of the intake passage on the downstream side of the intercooler;
    a fifth portion of the intake passage, on a downstream side of the throttle valve, is communicated with the crankcase through the fourth passage; and
    the PCV valve is configured to restrict a flow of gas from the intake passage through the fourth passage to the crankcase.

4. The blow-by gas recirculation device according to claim 1, further comprising a one-way valve configured to restrict a flow of gas from the crankcase to the intake passage through the first passage and the second passage.

5. The blow-by gas recirculation device according to claim 1, wherein the turbocharged engine is a hydrogen engine.

* * * * *